United States Patent [19]

Elmer

[11] Patent Number: 4,472,640
[45] Date of Patent: Sep. 18, 1984

[54] PEAK LOAD LIMITING

[76] Inventor: Bayard W. Elmer, 11005 Southeast 26th St., Bellevue, Wash. 98004

[21] Appl. No.: 466,858

[22] Filed: Feb. 16, 1983

[51] Int. Cl.³ .............................................. H02J 13/00
[52] U.S. Cl. ....................................... 307/35; 307/35; 307/41; 307/126
[58] Field of Search ...................... 307/35, 38, 41, 126

[56] References Cited

U.S. PATENT DOCUMENTS

| | | | |
|---|---|---|---|
| 2,199,639 | 5/1970 | Lee et al. ................................ | 307/35 |
| 2,521,171 | 9/1950 | Kercher .................................. | 307/35 |
| 2,645,726 | 7/1953 | Van Ryan et al. ..................... | 307/35 |
| 3,423,598 | 1/1969 | Goldberg ................................ | 307/35 |
| 4,066,913 | 1/1978 | Manning et al. ....................... | 307/38 |
| 4,390,876 | 6/1983 | Bjorklund et al. .............. | 307/35 X |
| 4,392,064 | 7/1983 | Alberti .............................. | 307/35 X |

Primary Examiner—A. D. Pellinen
Assistant Examiner—Derek Jennings
Attorney, Agent, or Firm—Charles Hieken

[57] ABSTRACT

An electric range is connected in series with first and second current sensing relays between power lines having 230 volts a.c. therebetween. An electric dryer is connected in series with normally closed contacts associated with the first current sensing relay between the first and second lines. A water heater is connected in series with normally closed contacts between the first and second lines and with normally open contacts between the first and a third neutral line. Both the latter contacts are associated with the second current sensing relay. The first current sensing relay operates at a first threshold level of current drawn by the electric range to open the normally closed contacts in series with the electric dryer. The second current sensing relay operates at a second threshold value higher than that of the first to open the normally closed contacts and close the normally open contacts in series with the electric water heater.

7 Claims, 1 Drawing Figure

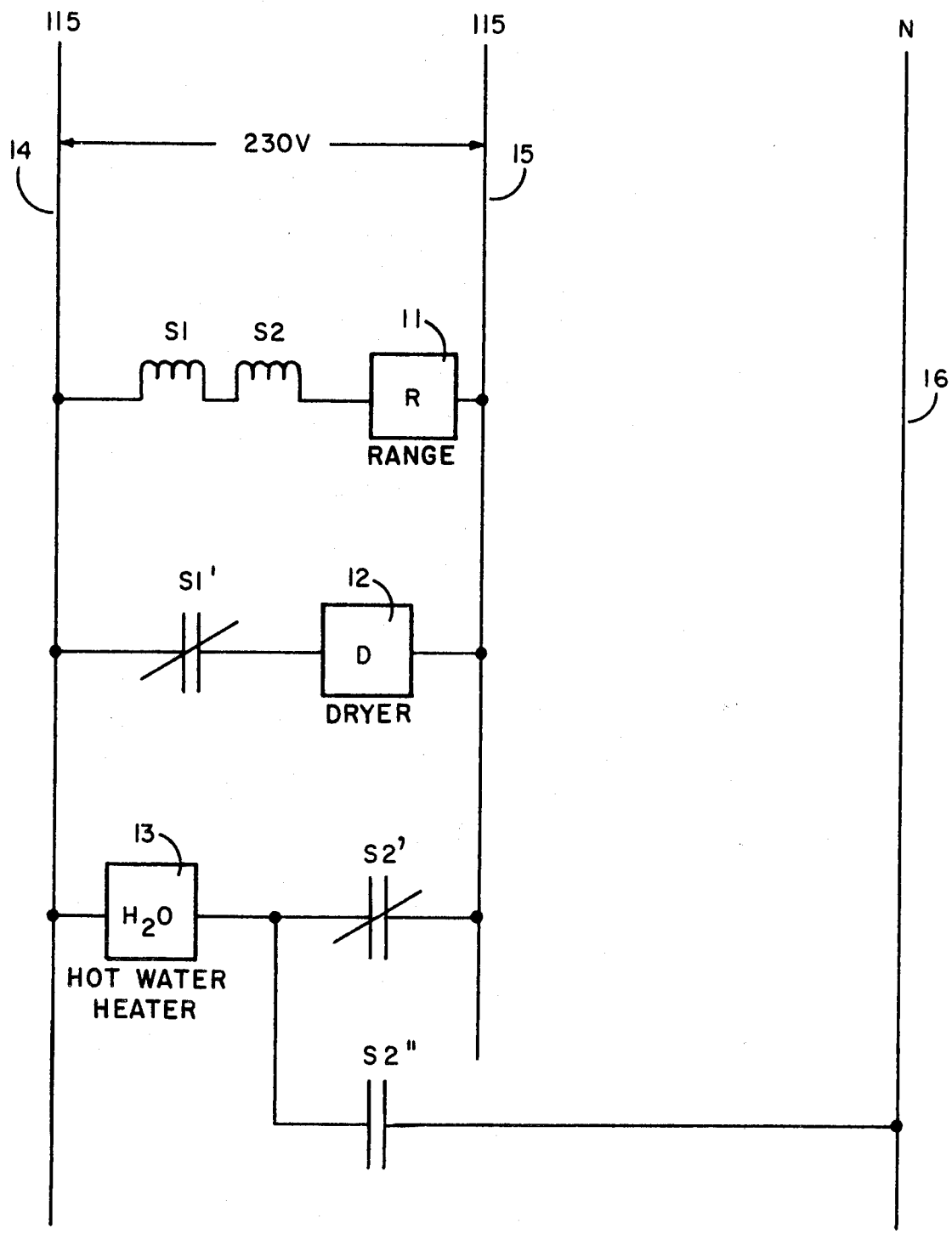

PEAK LOAD LIMITING

The present invention relates in general to peak load limiting and more particularly concerns novel apparatus and techniques for economically and reliably limiting peak loads in residential installations by automatically interrupting deferrable loads, such as water heaters, dryers and cooking ranges, according to a predetermined priority when the total load drawn by a higher priority appliance exceeds a predetermined value.

A serious problem for utilities providing electrical energy is meeting instantaneous peak capacity. Typical costs for adding peaking capacity are approximately $200 per kilowatt of capability for a combustion turbine installation of the 100 megawatt range and about $1,500 per kilowatt for a large base load coal plant. The energy costs on the busbar for these types of plants are approximately 200 mills per kilowatt-hour and 55 mills per kilowatt-hour for the combustion turbine and coal plant, respectively. All costs stated are 1981 dollars.

Accordingly, a number of utilities are using peak load management techniques to reduce peak load demands. Numerous techniques are available for managing loads. A search of subclasses 35, 38 and 492 of class 307 uncovered U.S. Pat. Nos. 2,199,639, 2,521,171, 2,565,631, 2,637,822, 2,645,726, 3,423,598, 3,858,110, British Pat. No. 553,183, Japanese Pat. No. 53-4030 and United Kingdom Pat. No. 2,019,138. U.S. Pat. Nos. 4,324,987 and 4,336,462 were also found.

It is an important object of the invention to provide an improved yet simple electrical load controller.

According to the invention, there is means for sensing the power or energy drawn by a first appliance and interrupting the flow of power or energy to a second appliance when the power or energy drawn by the first appliance exceeds a predetermined value. In a specific form of the invention, there is current sensing relay means responsive to the current being drawn by the first appliance exceeding a predetermined value for operating the current sensing relay means and opening associated normally closed contacts in series with the second appliance to interrupt power flow to the second appliance until the current drawn by the first appliance again becomes less than the predetermined value to release the current sensing relay means and again close the normally closed contacts.

Numerous other features, objects and advantages of the invention will become apparent from the following specification when read in connection with the accompanying drawing, the single FIGURE of which is a combined block-schematic diagram of an exemplary embodiment of the invention having an electric range, dryer and water heater controlled in accordance with the principles of the invention.

With reference now to the drawing, there is shown a combined block-schematic diagram of an exemplary embodiment of the invention for a residence having an electric range, an electric dryer and an electric water heater controlled in accordance with the invention. An electric range 11, electric dryer 12 and water heater 13 are connected in parallel between lines 14 and 15 providing typically 230 volts a.c. therebetween and 115 volts with respect to neutral line 16. Range 11 is connected in series with two current sensing relay means S1 and S2. Current sensing relay means S1 is associated with normally closed contacts S1' in series with dryer 12. Current sensing relay means S2 is associated with normally closed contacts S2' in series with water heater 13 and line 15 and normally open contacts S2" in series with water heater 13 and line 16.

Operation is as follows: Range operation has priority and is not interrupted. Current sensing relay S1 detects current flow in the range branch circuit when the range is in use. When the current rises to a predetermined value, typically 10.9 amps, corresponding to 2.5 kilowatts of power, the relay operates to open normally closed contacts S1' and interrupt the flow of energy to dryer 12. Reducing range load below 2.5 kilowatts releases relay S1 to close contacts S1' and allow dryer 12 to be restarted. 2.5 kilowatts is sufficient to allow operation of one cooktop burner element at maximum heat and another at partial heat. This mode of operation continues up to a range load of typically 7.5 kilowatts corresponding to 32.6 amps. This load is typically drawn by two oven elements at 3 kilowatts each and one cooktop burner at maximum heat drawing typically 1.5 kilowatts. At this load of 32.6 amps or 7.5 kilowatts, current sensing relay S2 operates to open normally closed contacts S2' and close normally open contacts S2". This action causes the voltage applied to water heater 13 to drop from 230 volts to 115 volts a.c. and thereby reduce the water heating load by substantially 3.4 kilowatts to leave a residual heating capacity of substantially 1.1 kilowatts.

The connected loads of most household ranges, dryers and electric hot water heaters are typically 12, 5 and 4.5 kilowatts, respectively, for a total of 21.5 kilowatts. For each residence having these three electric appliances, the serving electric utility supply system is exposed to that load. With the invention installed, the maximum load imposed by the three appliances is reduced to no more than 13.1 kilowatts, a saving of 8.4 peak kilowatts of load. For 10,000 homes in a service area each equipped with all three appliances, the invention could reduce the utility peak load by 84 megawatts. The actual reduction would be less than the theoretical 84 megawatt upper limit due to normal diversity in the simultaneous use of all three appliances in the hypothetical 10,000 homes. However, the actual reduction would still be substantial. In a city the size of Seattle, Washington, for example, 84 megawatts would represent a reduction in peak load of around 5% for only 10,000 homes equipped with the invention (1981 load data).

These advantages are achieved with relatively minor change in lifestyle that may be classified as a minor inconvenience on occasion. Operation of the dryer cannot occur if the range is operating with one oven element or two burners on. This means that significant cooking activity stops clothes drying, and the dryer requires restarting after the range load is reduced below the threshold of 2.5 kilowatts. Furthermore, use of the oven and two burners curtails ¾ of water heating capacity, but only when the oven element is on. Typically the oven element is cycling. Thus, water heating would take longer during range use, but families could readily adjust to minor inconveniences in bath and shower schedules for a significant rate reduction on their electrical power consumption. And people would readily adjust to using their electric clothes dryers when not cooking. Some cooking might also be deferred to microwave ovens or other efficient means.

The invention would have the overall effect of shifting the time of day usage of electrical energy. The net change in total annual kilowatt-hour consumption would most likely be none or a slight reduction.

The invention is believed to be capable of being manufactured, sold and installed for less than $400.00 for 8.4 kilowatts in peak generation capacity savings, or less than $50 per kilowatt compared with $200 per kilowatt to increase capacity with a combustion turbine and $1,500 per kilowatt to increase peak capacity with a coal plant. Furthermore the invention has economic advantages from the standpoint of operating and maintenance costs which is equivalent to the lifecycle cost to the utility in mills per kilowatt-hour of the rate reduction offered to the homeowner for installing the device. The utility could readily justify a rate reduction of 1 to 2 cents per kilowatt-hour. In Seattle, Washington, annual consumption is about 12,000 kilowatt-hours for the average home with non-electric heat, and 24,000 kilowatt-hours average for those electrically heated. Using this consumption as an example, homeowners could save from $120 to $480 annually, easily justifying the cost of installation.

There has been described novel apparatus and techniques for significantly reducing peak load demands with reliable apparatus relatively inexpensive to manufacture and install in a safe manner. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Peak load limiting apparatus for limiting the electrical power required by first and second appliances comprising, a relay having a coil and first and second contact pairs, energy sensing means comprising said coil in series with said first appliance for sensing the electrical energy drawn by said first appliance, and means comprising said first and second contact pairs connected between said second appliance and first and second different potentials respectively responsive to the energy drawn by said first appliance exceeding a first predetermined threshold for reducing the energy drawn by said second appliance while still delivering electrical energy thereto.

2. Peak load limiting apparatus in accordance with claim 1 wherein the latter means interrupts flow of energy to said second appliance.

3. Peak load limiting apparatus for limiting the electrical power required by first second and third appliances comprising, energy sensing means for sensing the electrical energy drawn by said first appliance, means responsive to the energy drawn by said first appliance exceeding a first predetermined threshold for reducing the energy drawn by said second appliance, said energy sensing means including means for sensing when the energy drawn by said first appliance exceeds a second threshold greater than said first threshold, and means responsive to said energy sensing means sensing said first appliance drawing energy in excess of said second threshold for reducing the flow of energy to said third appliance.

4. Peak load limiting apparatus in accordance with claim 1 and further comprising current sensing relay means having a coil in series with said first appliance comprising said energy sensing means and having first normally closed contact means comprising said means responsive to the energy drawn by said first appliance exceeding a first predetermined threshold for connection in series with said second appliance that opens when said first threshold is exceeded.

5. Peak load limiting apparatus in accordance with claim 3 and further comprising relay means having a coil in series with said first appliance comprising said energy sensing means and having first normally closed contact means for normally delivering a first higher current to said third appliance and second normally open contact means for delivering a second lower current to said third appliance when said second threshold level is exceeded to open the latter normally closed contacts and close the latter normally open contacts comprising said means responsive to said energy sensing means sensing said first appliance drawing energy in excess of said second threshold.

6. Peak load limiting apparatus in accordance with claim 4 wherein said relay means and said first appliance are connected in series between first and second lines having a first a.c. potential therebetween and said normally closed contact means and said second appliance are connected in series between said first and second lines whereby operation of said relay means occurs when said first threshold level is exceeded to open said normally closed contacts.

7. Peak load limiting apparatus in accordance with claim 5 wherein said relay means comprises first and second relays having first and second relay coils respectively connected between first and second lines having a first potential therebetween in series with said first appliance, said first relay having associated therewith normally closed contact means in series with said second appliance between said first and second lines with operation of said first relay when said first threshold level is exceeded to open said normally closed contact means, said second relay having associated therewith normally closed contact means in series with said first and second lines and having normally open contact means in series with said third appliance between said first line and a third line with the potential therebetween a second potential less than said first potential with operation of said second relay when said second threshold level is exceeded to open the latter normally closed contact means and close the latter normally open contact means.

* * * * *